United States Patent [19]
Pokhis

[11] Patent Number: 5,826,617
[45] Date of Patent: Oct. 27, 1998

[54] WATER SINK SYSTEM

[76] Inventor: Naum Pokhis, 1132 S. Doheny Dr., #303, Los Angeles, Calif. 90035

[21] Appl. No.: 587,105

[22] Filed: Jan. 11, 1996

[51] Int. Cl.[6] .................................................. F16K 51/00
[52] U.S. Cl. ....................................... 137/556.3; 137/606
[58] Field of Search .............................. 137/556.3, 556.6, 137/606

[56] References Cited

U.S. PATENT DOCUMENTS

| | | | |
|---|---|---|---|
| 1,054,623 | 2/1913 | Schreidt | 137/556.6 |
| 1,103,917 | 7/1914 | Lawson | 137/556.3 X |
| 2,989,075 | 6/1961 | Johnston | 137/556.6 |
| 4,417,601 | 11/1983 | Bennett | 137/556.69 |
| 4,742,848 | 5/1988 | Black | 137/556.3 |
| 5,487,408 | 1/1996 | Pokhis | 137/606 X |

*Primary Examiner*—Stephen M. Hepperle
*Attorney, Agent, or Firm*—Ilya Zborovsky

[57] ABSTRACT

A water sink system comprises two knobs each turnable to adjust hot water and cold water correspondingly, and means for turning knobs to a predetermined angle so that a water from a mixing device connected with both the knobs flows with a desired temperature, the means including a scale formed as a disc and provided with a plurality of lines with numbers, and a central opening so as to be placed on an outer surface of a sink, and a pointer arranged in a bushing extending through the central opening of the scale and located inside a handle, so that by turning of the handle the pointer is turned relative to the scale.

4 Claims, 1 Drawing Sheet

WATER SINK SYSTEM

BACKGROUND OF THE INVENTION

The present invention relates to a water sink system. It is known that water sink systems include a sink and usually two turning knobs for hot water and cold water. In order to adjust the temperature of the water which the user needs for each particular use, the user opens the turning knob of hot water and opens the turning knob of cold water and performs many manipulations until he reaches the desired temperature. During this process a lot of water is actually wasted. In my patent application Ser. No. 08/346,870 it was proposed to attach scales to the horizontal plane near the knobs and to attach pointers to each of the knobs so that the angle of turning of any of the knobs can be therefore determined. This effectively solves the problem of economizing water during adjustment of its final temperature for the water flow. However, the knobs nowadays have different constructions, in particular such that sometimes there is no space for attaching the scales and pointers.

SUMMARY OF THE INVENTION

Accordingly, it is an object of the present invention to propose a water sink system which avoids the disadvantages of the prior art and is more universal.

In keeping with these objects and with others which will become apparent hereinafter, one feature of the present invention resides, briefly stated, in a water sink system in which a flat O-ring provided with a scale and numbers and having a central opening is mounted on a round nut of the knob mount. A pointer is attached to the knob handle in particular to use an empty space which is available in the handles of different models, and a rounded springy strip with a pointer inside is inserted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
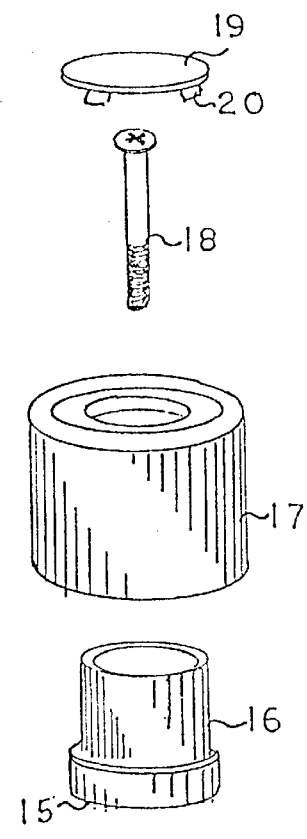
FIG. 1 is an exploded view of a knob with a scale and a pointer.
Figure 2:
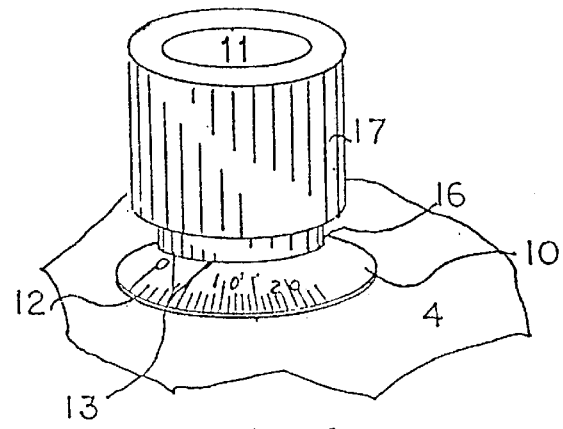
FIG. 2 is a view showing the knob with a scale and a pointer in an assembled condition.

A water sink system in accordance with the present invention has a knob provided with a body 1 with an outer thread 2. The body is mounted in an opening 3 of a sink 4 and connected with corresponding pipes. A nut 5 mounts in the body 1 a screw with a valve. The valve has an upper portion with a toothed surface 6 and a threaded opening 7. The body 1 is covered with a shaped washer 8 and a round nut 9 to be attached with the sink 4.

A scale 10 is flat or oval and has an opening 11 tightly placed on the round nut 9. Lines 12 are provided on the scale 10. A pointer 13 is arranged on a springy oval strip 14 and inserted into the lower part 15 of a bushing 16. A handle 17 is arranged on top of the bushing 16 and attached by a screw 18 extending into the threaded opening 7. The upper opening in the handle 17 is closed by a cover 19 having springy tongues 90.

In order to use the knob designed as specified hereinabove, it is turned to a position when water does not flow. Then, the handle 17 is held with one hand, and the scale 10 is turned by another hand so that it is convenient to see the lines 12, and the pointer 13 is turned inside the bushing 16 so that it points to the 0 line. Then the handle 17 is turned so that the pointer 13 is pointed to a test line of the scale 10. The same actions are performed with the second knob. When water from a mixing pipe which connects hot water and cold water outlets flows out with a required temperature, the lines to which the pointers were pointed on both knobs are memorized or written down. In the future when it is necessary to use water of a desired temperature and pressure, it is no longer necessary to find angles of turning for each knob, but instead the knobs can be turned immediately to the preliminarily selected lines on the scale.

It is to be understood that while only one knob with one scale and pointer is shown in the drawing, the system is used for two knobs. In the second knob the same parts are to be mounted.

It will be understood that each of the elements described above, or two or more together, may also find a useful application in other types of constructions differing from the types described above.

While the invention has been illustrated and described as embodied in a water sink system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A water sink system, comprising two knobs each turnable to adjust hot water and cold water correspondingly; and means for turning knobs to a predetermined angle so that a water from a mixing device connected with both said knobs flows with a desired temperature, said means including a scale formed as a disc and provided with a plurality of lines with numbers, and a central opening so as to be placed on an outer surface of a sink, and a pointer arranged in a bushing extending through said central opening of said scale and located inside a handle, so that by turning of the handle said pointer is turned relative to said scale, said pointer being mounted on a springy strip which is springily retained in said bushing.

2. A water sink system as defined in claim 1, wherein said handle is hollow; and further comprising a screw extending through a hollow interior of said handle and screwed into a counterscrew.

3. A water sink system as defined in claim 1, wherein said disc which forms said scale is circular.

4. A water sink system as defined in claim 1, wherein said disc which forms said scale is oval.

* * * * *